US006996654B2

(12) United States Patent
Adkisson et al.

(10) Patent No.: US 6,996,654 B2
(45) Date of Patent: Feb. 7, 2006

(54) SYSTEMS AND METHODS FOR GENERATING MULTIPLE TRANSACTION IDENTIFIERS TO REDUCED LATENCY IN COMPUTER ARCHITECTURE

(75) Inventors: Richard W. Adkisson, Dallas, TX (US); Christopher Alan Greer, Allen, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 10/434,657

(22) Filed: May 9, 2003

(65) Prior Publication Data

US 2004/0225820 A1 Nov. 11, 2004

(51) Int. Cl.
*G06F 13/36* (2006.01)

(52) U.S. Cl. .......................... 710/306; 713/400; 718/1

(58) Field of Classification Search ................ 710/100, 710/305, 306, 313, 310, 52; 718/100, 101; 713/400; 709/253; 370/465, 350; 375/354; 340/825.2

See application file for complete search history.

(56) References Cited

U.S. PATENT DOCUMENTS

| 4,615,001 | A | | 9/1986 | Hudgins, Jr. | |
|---|---|---|---|---|---|
| 5,317,720 | A | | 5/1994 | Stamm et al. | |
| 5,918,070 | A | * | 6/1999 | Moon et al. | 710/22 |
| 6,173,349 | B1 | * | 1/2001 | Qureshi et al. | 710/110 |
| 6,195,722 | B1 | * | 2/2001 | Ram et al. | 710/310 |
| 6,345,352 | B1 | | 2/2002 | James et al. | |
| 6,493,776 | B1 | | 12/2002 | Courtright et al. | |
| 6,732,208 | B1 | * | 5/2004 | Alsaadi et al. | 710/112 |
| 2002/0019903 | A1 | | 2/2002 | Lin | |
| 2003/0079073 | A1 | | 4/2003 | Richard et al. | |

FOREIGN PATENT DOCUMENTS

| EP | 0201252 | 5/1985 |
|---|---|---|
| EP | 0583965 | 8/1992 |
| EP | 1089500 | 4/2001 |
| EP | 1128612 | 8/2001 |

OTHER PUBLICATIONS

"An online adaptive neuro-fuzzy power system stabilizer for multimachine systems" by Ruhua You; Eghbali, H.J.; Nehrir, M.H. (abstract only) Publication Date: Feb. 2003.*
Affidavit of Richard W. Adkisson, Feb. 17, 2005, 4 pages.

* cited by examiner

*Primary Examiner*—Gopal C. Ray

(57) ABSTRACT

Systems and methods generate transaction identifiers. A plurality of available transaction identifiers are generated for use in identifying future transactions from a first bus. A new transaction identifier is generated upon receipt of each received transaction from the first bus. One of the available transaction identifiers is assigned to each received transaction prior to generation of the new transaction identifier so that the received transaction communicated on a second bus is identified by the one transaction identifier.

20 Claims, 8 Drawing Sheets

SYSTEMS AND METHODS FOR GENERATING MULTIPLE TRANSACTION IDENTIFIERS TO REDUCED LATENCY IN COMPUTER ARCHITECTURE

RELATED APPLICATIONS

This application is related to the following commonly owned and co-filed U.S. Patent applications, filed May 9, 2003 and incorporated herein by reference:

U.S. patent application Ser. No. 10/434,637 entitled "Systems And Methods For Deleting Transactions From Multiple Fast Data Streams". U.S. patent application Ser. No. 10/435,639 entitled "Systems And Methods To Insert Broadcast Transactions Into A Fast Data Stream Of Transactions". U.S. patent application Ser. No. 10/434,656 entitled "Systems And Methods For Combining A Slow Data Stream And A Fast Data Stream Into A Single Fast Data Stream", and U.S. patent application Ser. No. 10/434,655 entitled "Systems And Methods For Increasing Transaction Entries In A Hardware Queue".

BACKGROUND

In a high speed computing system, a large number of transactions (e.g., memory read, memory write, etc.) are generated by internal processors connected together by a processor bus. These transactions are communicated to devices on another bus through a core electronic complex known as a "chipset." For each transaction, the chipset generates a unique transaction identifier (ID) and then manages the transaction through its expiration.

More particularly, the chipset includes a transaction ID generator, which produces each transaction ID, and a transaction processor, which assigns the transaction ID to the transaction and thereafter manages and tracks the transaction. It is important that the chipset assign the transaction ID to each transaction immediately after the transaction is received by the chipset so that the transaction may be used without substantial latency.

Latency nonetheless occurs because the transaction processor and the transaction ID generator are not in close proximity to one another and do not operate within the same clocking domain: the transaction processor operates within the clock domain associated with the processor bus; the transaction ID generator operates within a different clocking domain associated with the chipset. Within any one clock domain, a signal is typically synchronized with a clock that defines its validity. When the signal transitions from one clock domain to another clock domain, the signal is synchronized to match the clock of the destination clock domain. In the chipset, a synchronizer operates to synchronize transaction signals across the two time domains, and, in so doing, incurs a time delay that increases latency in generating the transaction ID.

In addition, the transaction ID generator requires a finite time period to generate a new transaction ID, further increasing latency. The time period is determined, in part, by the time it takes the transaction ID generator to specify a new transaction ID that does not conflict with an active transaction ID, since the transaction ID generator may only generate a maximum number of unique transaction IDs. The time period is further impacted by the time it takes the transaction ID generator to manage a transaction table that stores information relating to the identified transaction.

The transaction ID generator also generates transaction IDs sequentially, and only one transaction ID is made available to the transaction processor at any one time. After assigning a transaction ID to a transaction, the transaction processor must therefore wait for a new transaction ID from the transaction ID generator before processing new transactions, resulting in additional latency in the generation of transaction IDs for new transactions.

Since the state of the art high speed computing system utilizes multiple high speed busses, the allowable time to generate each transaction ID is reduced; an improvement to system performance therefore needs to address latency in generating the transaction ID.

SUMMARY OF THE INVENTION

In one aspect, one method generates transaction identifiers, including: generating a plurality of available transaction identifiers for use in identifying future transactions from a first bus; generating a new transaction identifier upon receipt of each received transaction from the first bus; and assigning one of the available transaction identifiers to each received transaction prior to generation of the new transaction identifier so that the received transaction communicated on a second bus is identified by the one transaction identifier.

In another aspect, one system generates transaction identifiers. A transaction processor receives transactions and assigns an available transaction identifier to each of the received transactions. A transaction ID generator generates two or more available transaction identifiers and tracks assigned transaction identifiers. The transaction ID generator is responsive to a new transaction signal to generate a next available transaction identifier.

In yet another aspect, a chipset communicates transactions from a first bus to a second bus, including: means for generating a plurality of available transaction identifiers for use in identifying presently unreceived transactions from the first bus; means for generating a new transaction identifier upon receipt of each received transaction from the first bus; and means for assigning one of the available transaction identifiers to each received transaction prior to generation of the new transaction identifier so that the received transaction communicated on the second bus is identified by the one transaction identifier.

DETAILED DESCRIPTION OF THE FIGURES

Figure 1:
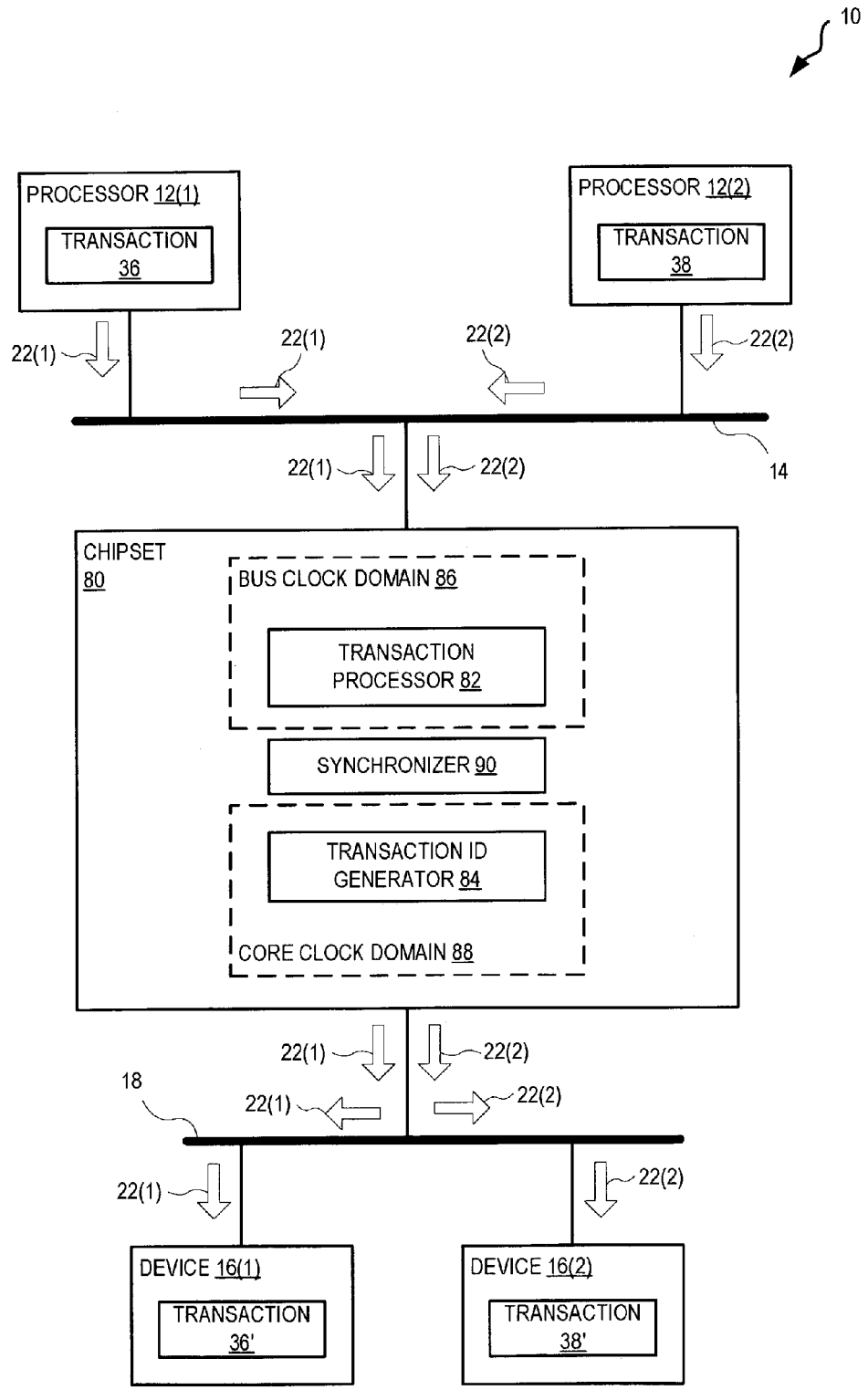
FIG. 1 is a block diagram showing one system for generating transaction identifiers.

FIG. 1 is a block diagram showing one system 10 that generates transaction identifiers ("transaction IDs"), for example to decrease latency in assigning transaction IDs to transactions. System 10 is illustratively shown with two processors 12(1) and 12(2) connected to a processor bus 14, and two devices 16(1) and 16(2) connected to a bus 18. A data stream 22(1) represents data communications from processor 12(1) to device 16(1) over buses 14 and 18. A data stream 22(2) represents data communications from processor 12(2) to device 16(2) over buses 14 and 18. A chipset 80 connects processor bus 14 to bus 18, and operates to facilitate data communications 22(1), 22(2) between processors 12 and devices 16.

Chipset 80 has a transaction processor 82 and a transaction ID generator 84. Transaction processor 82 and transaction ID generator 84 may be located in different clock domains; for example, transaction processor 82 is in a bus clock domain 86 and transaction ID generator 84 is in a core clock domain 88. Communication between clock domain 86 and clock domain 88 is facilitated by a synchronizer 90, containing ratio logic that converts signals from bus clock domain 86 to core clock domain 88 and from core clock domain 88 to bus clock domain 86.

In illustrative operation, processor 12(1) sends a transaction 36 to device 16(1) in data stream 22(1) and processor 12(2) sends a transaction 38 to device 16(2) in data stream 22(2). Transaction processor 82 receives transaction 36 from processor 12(1) in data stream 22(1) on processor bus 14. Transaction processor 82 assigns a first transaction ID, generated by transaction ID generator 84, to transaction 36 and then sends transaction 36 to device 16(1) in data stream 22(1) on bus 18. Device 16(1) then processes transaction 36 as indicated by transaction 36'.

Likewise, transaction processor 82 receives transaction 38 in data stream 22(2) on processor bus 14, and assigns a second transaction ID, generated by transaction ID generator 84, to transaction 38 and sends transaction 38 to device 16(2) in data stream 22(2) on bus 18. Device 16(2) then processes transaction 38 as indicated by transaction 38'.

As appreciated by those skilled in the art, additional data streams may exist within system 10, for example to facilitate data communication from processors 12 to devices 16 over busses 14 and 18, or to facilitate data communications from device 16 to processor 12. FIG. 1 shows only two data streams 22(1) and 22(2) for clarity of illustration.

Figure 2:
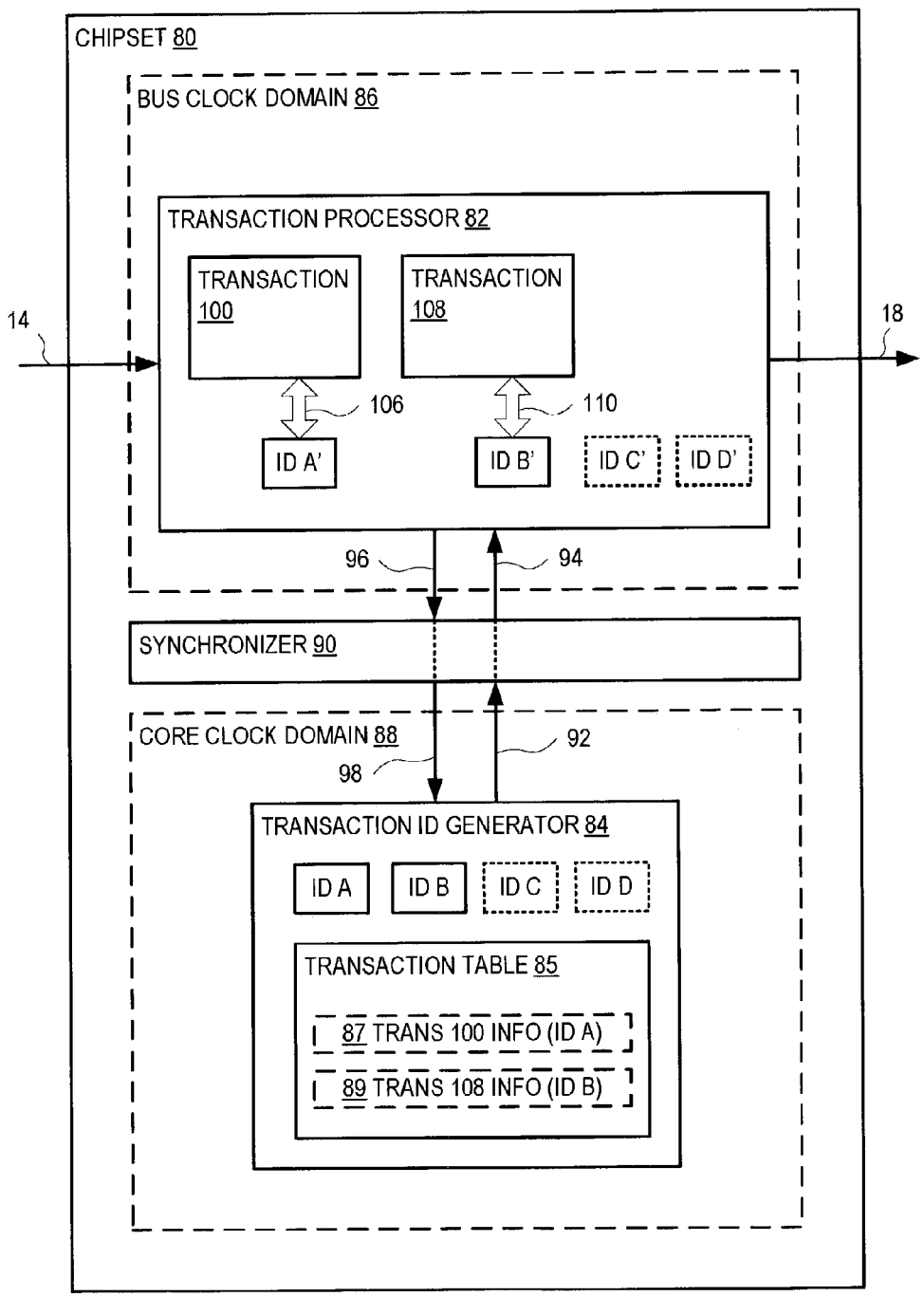
FIG. 2 is a block diagram illustrating exemplary detail and operational use of the chipset of FIG. 1.

FIG. 2 is a block diagram illustrating exemplary detail and operational use of chipset 80. Chipset 80 decreases latency in assigning a transaction ID within a high speed computer system by providing a plurality of transaction IDs for use with incoming future (i.e., presently unreceived) transactions, thereby increasing performance of system 10.

In the example, transaction ID generator 84 generates two available transaction IDs, ID A and ID B, and transfers both ID A and ID B to transaction processor 82 via a bus 92, synchronizer 90, and a bus 94. Transactions ID A and ID B are shown as ID A' and ID B' within bus clock domain 86. The transfer of transaction ID A and transaction ID B to bus clock domain 86 provides a timing improvement over prior art solutions that only transfer a single transaction ID to transaction processor 82, for use with future transactions.

More particularly, in the example, transaction processor 82 receives a transaction 100 (a "received" transaction) from processor 12(1) over processor bus 14. Transaction processor 82 assigns ID A' to transaction 100, as indicated by arrow 106, and sends transaction 100 to device 16(1) via bus 18. Transaction processor 82 sends a new transaction signal to transaction ID generator 84 via a bus 96, synchronizer 90, and a bus 98. Transaction ID generator 84 stores information of transaction 100 in a transaction table 85 (shown as a table entry 87), to track transaction 100 within high speed computer system 10.

Transaction ID generator 84 in turn generates a new available transaction ID, ID C, and transfers ID C to transaction processor 82 via bus 92, synchronizer 90 and bus 94. ID C, shown as ID C' in bus clock domain 86, is then available for use by transaction processor 82 for incoming future transactions.

In the example, transaction processor 82 receives a second transaction 108 (another "received" transaction) via processor bus 14 before ID C has been received within bus clock domain 86. However, since ID B' is already available within bus clock domain 86, transaction processor 82 uses ID B' to identify transaction 108, as indicated by arrow 110. Therefore, transaction 108 is processed and forwarded to its destination without delay associated with generating a new transaction ID. Transaction processor 82 then sends a new transaction signal to transaction ID generator via bus 96, synchronizer 90 and bus 98, such that transaction ID generator 84 stores information of transaction 108 in transaction table 85 (shown as a table entry 89) and generates a new transaction ID D, as shown. ID D is transferred to bus clock domain 86 via bus 92, synchronizer 90 and bus 94, and is shown as ID D' in bus clock domain 86.

Those skilled in the art will appreciate that chipset 80 is not limited to transferring two transaction IDs (e.g., ID A and ID B) concurrently and that any number of transaction IDs may be made available within bus clock domain 86, as required to meet transaction processing demands within chipset 80.

Figure 3:
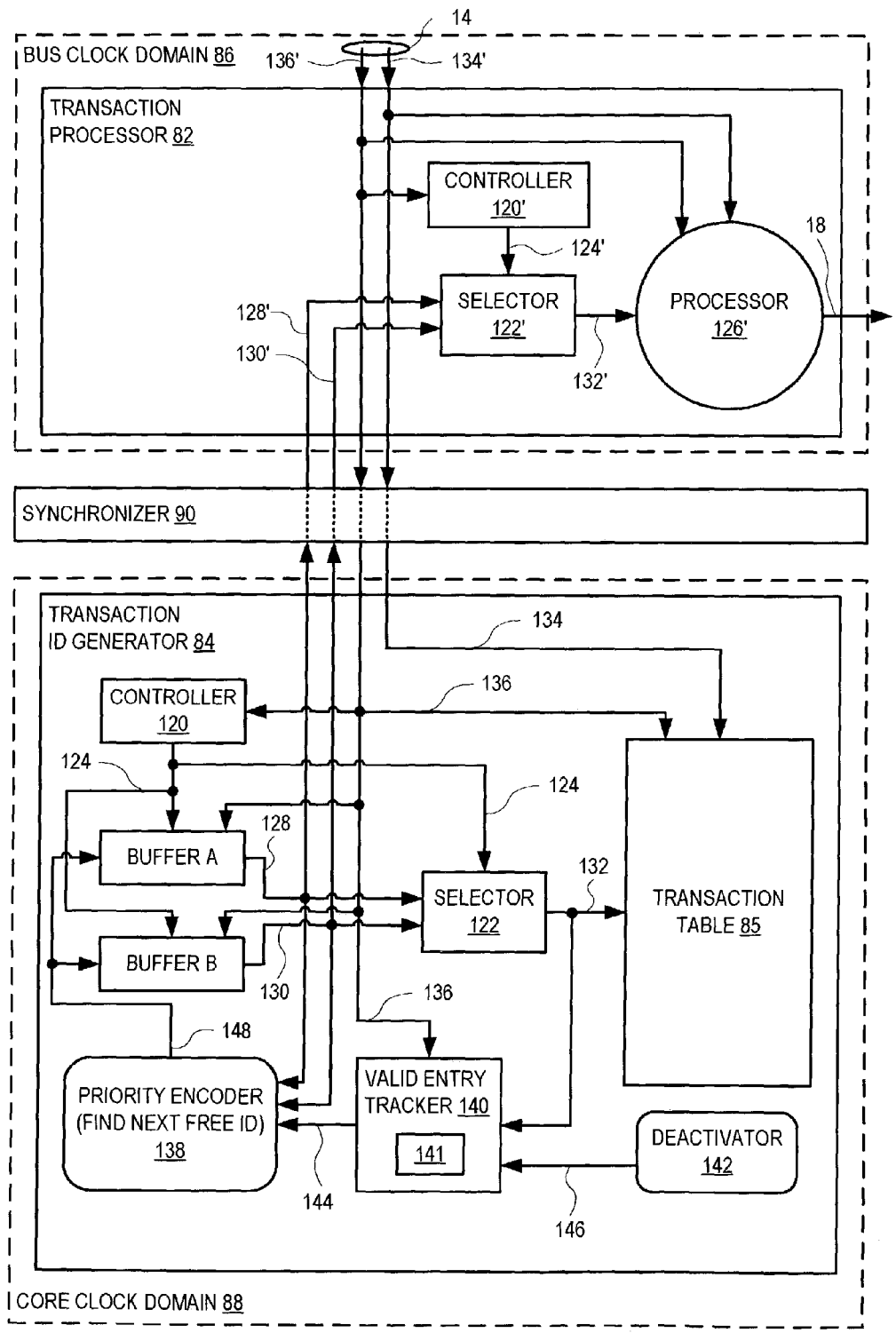
FIG. 3 schematically illustrates further exemplary detail of the chipset of FIG. 2.

FIG. 3 is a block diagram showing further exemplary detail of chipset 80. In FIG. 3, processor bus 14 is illustrated as two parts: a new transaction signal 136' and a data signal 134'. Data signal 134' is used to transfer data associated with transaction 100, while new transaction signal 136' indicates that the data is available. New transaction signal 136' propagates through synchronizer 90 to core clock domain 88, as new transaction signal 136. Data signal 134' propagates through synchronizer 90 to core clock domain 88, as data path 134.

Transaction ID generator 84 receives new transaction signal 136' as new transaction signal 136 when a new transaction (e.g., transaction 100) is received by transaction processor 82. Transaction ID generator 84 responds to new transaction signal 136 to store information about transaction 100 and transaction ID A in transaction table 85, as assigned to transaction 100 by transaction processor 82.

New transaction signal 136 is also connected to a valid entry tracker 140; valid entry tracker 140 responds to new transaction signal 136 to update an internal bit array 141 that tracks active transaction IDs. Transaction ID A, received by valid entry tracker 140 over data path 132, indexes bit array 141 to set a bit indicating that transaction ID A is in use. Valid entry tracker 140 receives notification when a transaction ID is no longer active from a deactivator 142, via data path 146, to clear the associated entry in bit array 141; the associated entry in transaction table 85 may also be deleted or retired.

New transaction signal 136 also connects to a controller 120 that generates a signal 124 selecting one of two buffers, A and B, one of which holds the next available transaction ID for transaction processor 82; new transaction signal 136 instructs controller 120 which buffer A or B to select. Signal 124 from controller 120 identifies the buffer, A or B, containing the next transaction ID to be used by transaction processor 82. A selector 122 receives the transaction ID held by buffer A via data path 128 and the transaction ID held by buffer B via data path 130. Signal 124 from controller 120 directs selector 122 to output either buffer A transaction ID or buffer B transaction ID on data path 132.

A priority encoder 138 analyzes bit array 141 of valid entry tracker 140 via a data path 144, and receives the next two available transaction IDs stored in buffer A and buffer B via data paths 128 and 130, respectively. Priority encoder 138 selects a next lowest transaction ID that is neither marked as active in bit array 141 nor held in either buffer A or buffer B. The next lowest transaction ID selected by priority encoder 138 is output over a data path 148 to both buffer A and buffer B. For example, assuming ID A, ID B and ID C represent the first three transaction IDs, 0, 1, and 2, buffer A is initialized to ID A and buffer B is initialized to ID B. Assuming all other transaction IDs are indicated as inactive by bit array 141, priority encoder 138 selects ID C for output over data path 148.

Buffer A and buffer B also connect to new transaction signal 136 and signal 124 from controller 120. If signal 124 identifies buffer A when new transaction signal 136 is activated, buffer A loads ID C from priority encoder 138 over data path 148. If signal 124 identifies buffer B when new transaction signal 136 is activated, buffer B loads ID C from priority encoder 138 over data path 148.

The transaction ID held in buffer A is output to data path 128. Data path 128 is propagated to bus clock domain 86, through synchronizer 90, and is shown as a data path 128'. Similarly, the transaction ID held in buffer B is output to a data path 130. Data path 130 propagates to bus clock domain 86 through synchronizer 90 and is shown as a data path 130'.

Transaction processor 82 also contains a controller 120' that operates like controller 120 to generate a signal 124' selecting one of two buffers, A or B, over data paths 128' and 130', respectively. New transaction signal 136' connects to controller 120' to denote which buffer A or B to select. Signal 124' also connects to a selector 122' within transaction processor 82. Selector 122' operates like selector 122 to select either buffer A or buffer B received via data paths 128' and 130', respectively, for output to a data path 132'. Data path 132' carries the next transaction ID (e.g., ID A) to be assigned to a new transaction (e.g., transaction 100) received by a processor 126 of transaction processor 82.

As appreciated by those skilled in the art, the interconnectivity of chipset 80 synchronizes controller 120' and controller 120 during operation of transaction processor 82 and transactions ID generator 84. Controller 120' operates within bus clock domain 86 such that transaction processor 82 operates without the signal delay induced by synchronizer 90 during assignment of transaction IDs to received transactions. The transaction ID assigned to transaction 100 by transaction processor 82 is input simultaneously to transaction table 85 and valid entry tracker 140.

Figure 4:
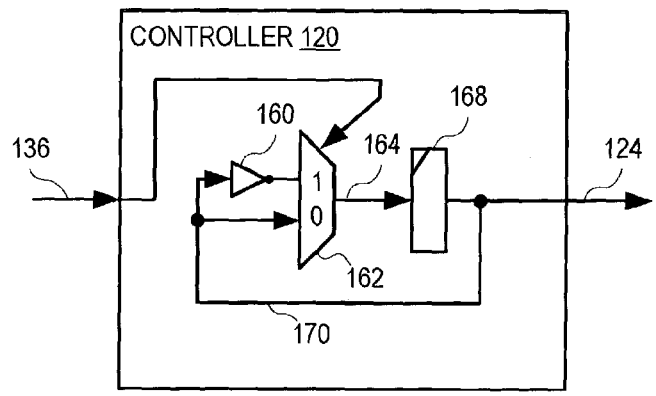
FIG. 4 is a schematic diagram illustrating one example of a controller of FIG. 3.

FIG. 4 is a schematic diagram illustrating one embodiment of controller 120 of FIG. 3. Controller 120 includes an inverter 160, a switch 162 and a latch 168. Switch 162 has one output signal 164 that changes state when new transaction signal 136 is activated. Output signal 164 is latched by latch 168 to produce output signal 124, which is fed back via a signal 170 to two inputs of switch 162 (one through inverter 160, as shown). In this embodiment, each activation of new transaction signal 136 toggles output 124 from zero, to one, to zero, and so on. Controller 120' may be constructed similarly.

Figure 5:
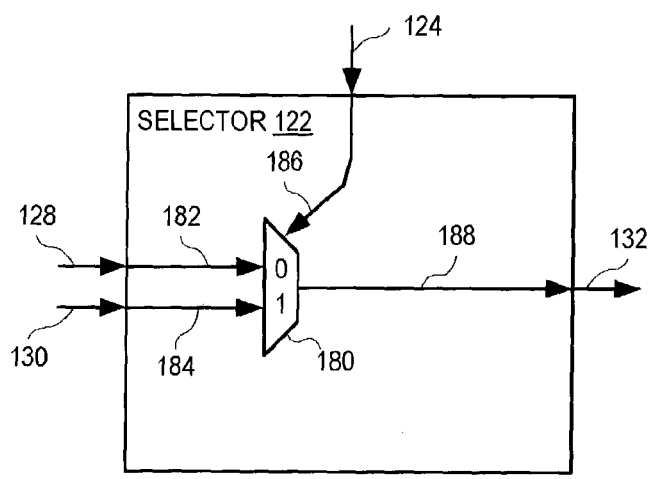
FIG. 5 is a schematic diagram illustrating one example of a selector of FIG. 3.

FIG. 5 is a schematic illustrating one embodiment of selector 122 of FIG. 3. Selector 122 has a switch 180 with three inputs: 182, 184 and 186. Input 182 is connected to data path 128, input 184 is connected to data path 130, and input 186 is connected to signal 124 from controller 120. Switch 180 has one output 188, forming data path 132. Signal 124 connects output 188 to either input 182 or input 184 of switch 180, thereby connecting either data path 128 or data path 130 to data path 132. Selector 122' may be constructed similarly.

Figure 6:
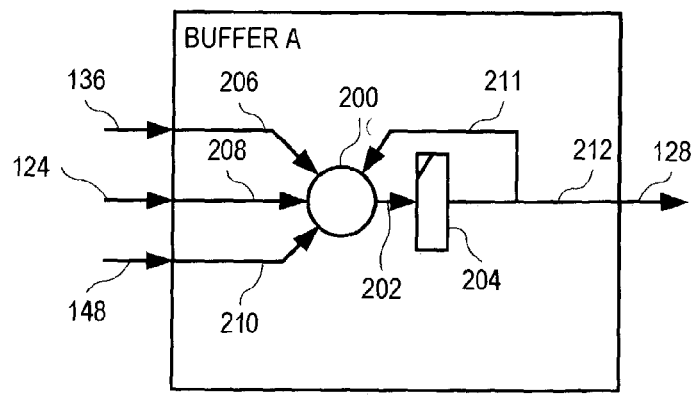
FIG. 6 is a schematic diagram illustrating one example of a buffer of FIG. 3.

FIG. 6 is a schematic diagram illustrating one embodiment for buffer A of FIG. 3. In FIG. 6, buffer A has a state machine 200 and a latch 204. State machine 200 has four inputs, 206, 208, 210 and 211: input 206 connects to new transaction signal 136; input 210 connects to data path 148; input 208 connects to signal 124 from controller 120; and input 211 connects to output signal 212 of latch 204. If signal 124 does not indicate that buffer A is selected, no action is taken by buffer A. If signal 124 indicates that buffer A is selected, and if input 136 is active, information from input 148 is transferred to latch 204 via data path 202 and output from latch 204 to data path 128 (via data path 212).

Figure 7:
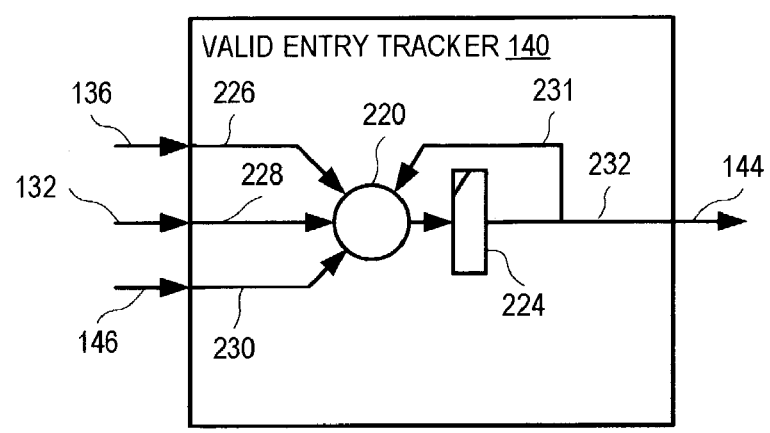
FIG. 7 is a schematic diagram illustrating one example of the valid entry tracker of FIG. 3.

FIG. 7 is a schematic diagram illustrating one embodiment of valid entry tracker 140. In FIG. 7, valid entry tracker 140 includes a state machine 220 and a latch 224. Latch 224 is a bit array used to track active transaction IDs within system 10, FIG. 1. State machine 220 has four inputs, 226, 228, 230 and 231: input 226 connects to new transaction signal 136; input 228 connects to data path 132 from selector 122; input 230 connects to data path 146 from deactivator 142; and input 231 connects to output 232 of latch 224. When new transaction signal 136 is activated, a transaction ID is input from data path 132 to input 228 and is used to update latch 224 to mark the transaction ID as active. Data path 146 sends transaction deactivation IDs to state machine 220 via input 230. State machine 220 uses information from input 230 to clear entries in latch 224 such that the indicated transaction ID may be reused for other transactions. Latch 224 is output via data path 232 to data path 144.

Figure 8:
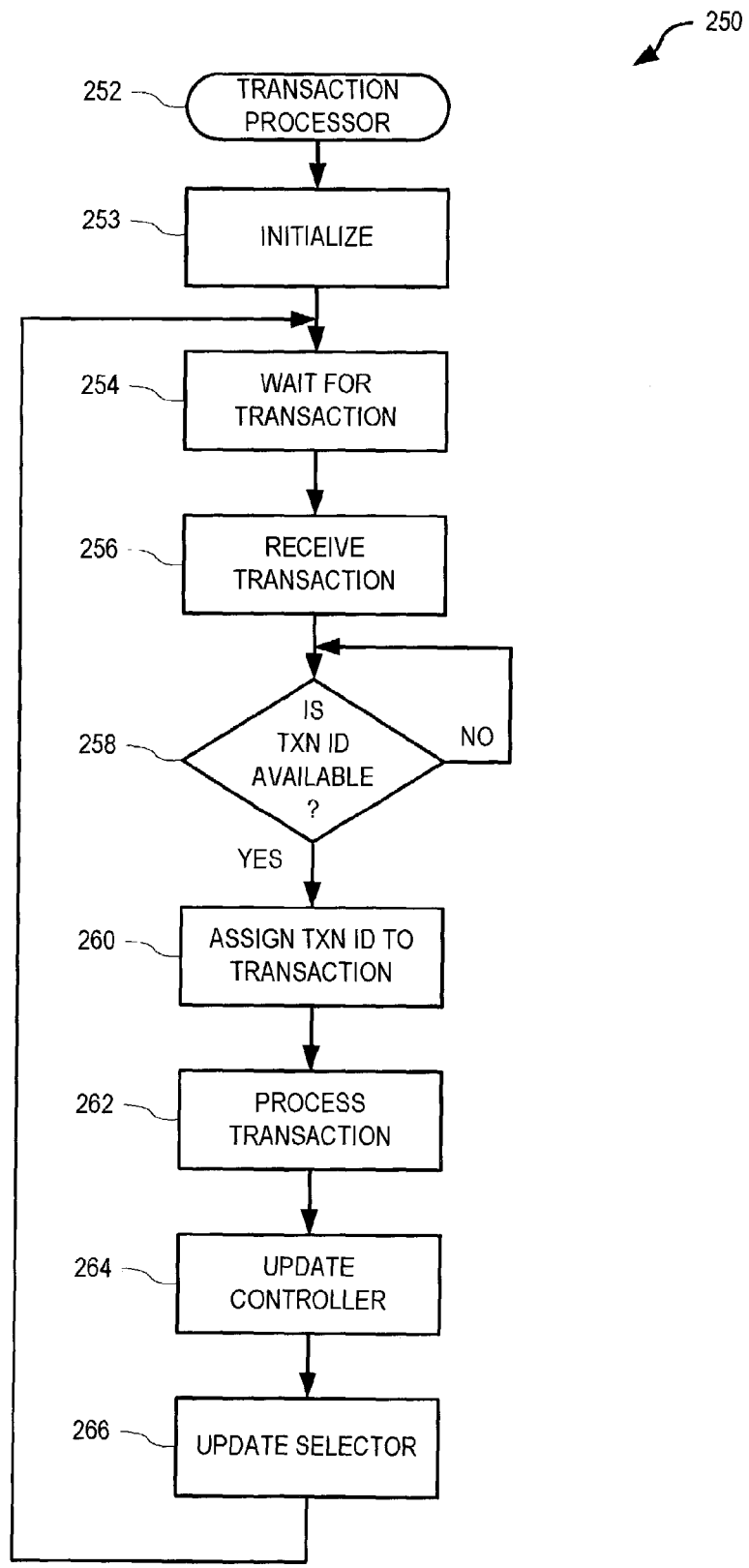
FIG. 8 shows a flowchart illustrating one method of operation for the system of FIG. 2.

FIG. 8 is a flowchart illustrating one process 250 for processing transaction 100 in transaction processor 82. Process 250 starts at step 252 and continues with step 253.

Step 253 initializes transaction processor 82. In particular, controller 120' is initialized and synchronized with controller 120 of transaction ID generator 84. For example, if controller 120 is initialized to select buffer A, controller 120' will be initialized to select buffer A'.

Step 254 waits for new transaction signal 136' to indicate that transaction 100 is available on data signal 134'.

Step 256 reads the transaction from data signal 134' into transaction processor 126.

Step 258 is a condition. If a new transaction ID is not available, process 250 waits at step 258; otherwise process 250 continues with step 260. For example, if transaction processor 82 has already used transaction ID A and transaction ID B and transaction ID generator 84 had not yet generated transaction ID C, process 250 waits at step 258. Nonetheless, one advantage of process 250 is that the wait and latency associated with step 258 may be eliminated by ensuring enough transaction IDs are available for new transactions.

Step 260 assigns a new transaction ID (e.g., transaction ID A) to transaction 100. For example, in step 260, transaction processor 126' reads transaction ID A from data path 132'.

Step 262 processes transaction 100 within transaction processor 126. For example, in step 262, transaction ID A may be added to transaction 100 which is then forwarded to the destination of transaction 100.

Step 264 updates controller 120' to indicate the next available buffer containing a new transaction ID. For example, in step 264, after using transaction ID A from buffer A', controller 120' may indicate buffer B'.

In step 266, selector 122' is updated, using signal 124' from controller 120'. For example, in step 266, if controller 120' indicates buffer B', selector 122' switches data path 130' through to data path 132'.

Process 250 continues with step 254, where it waits for further transactions. As appreciated by those skilled in the art, process 250 operates within transaction processor 82 to receive, identify and process transactions in an expedited manner.

Figure 9:
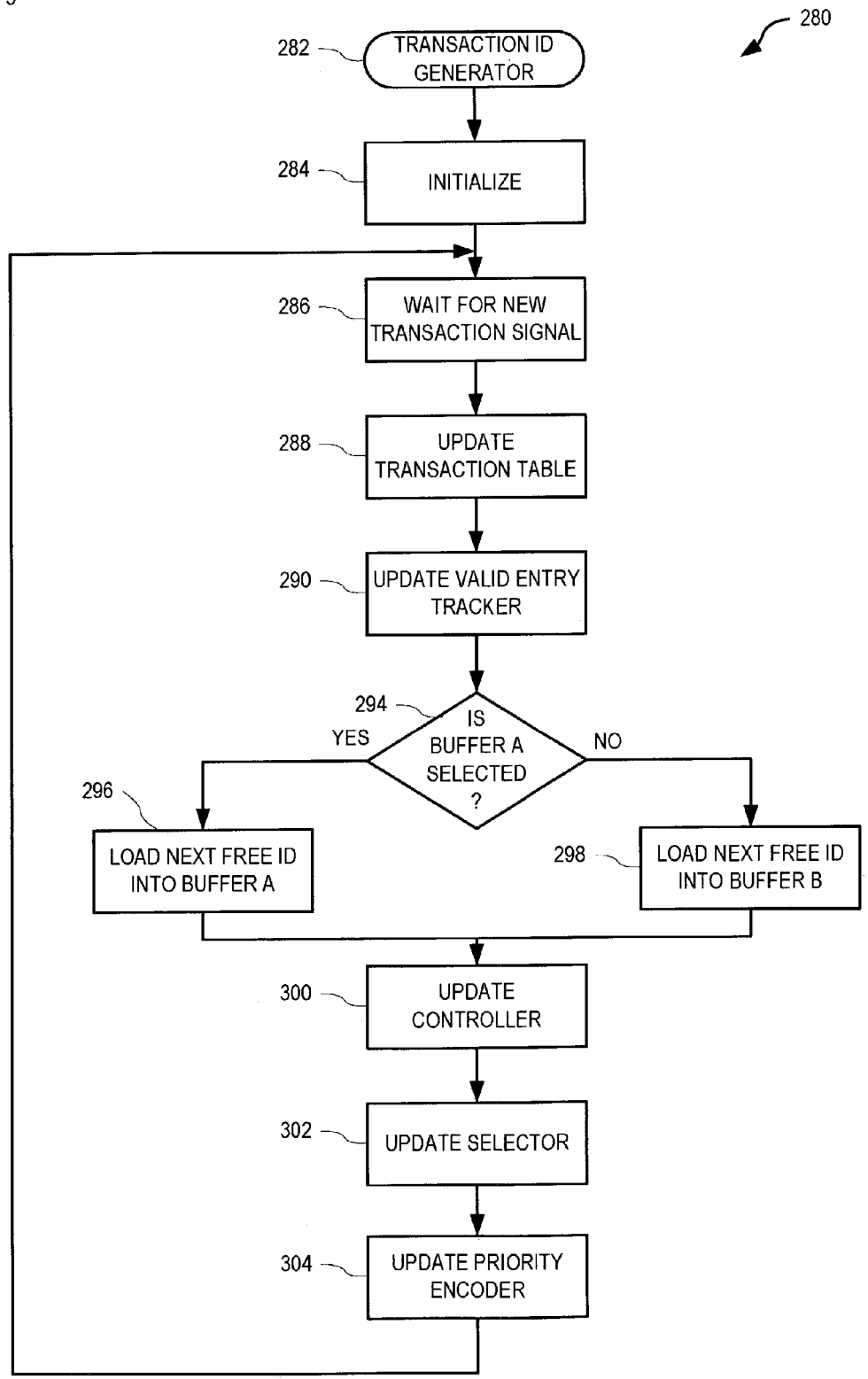
FIG. 9 shows a flowchart illustrating one method of operation for the system of FIG. 2.

FIG. 9 is a flowchart illustrating one process 280 by which transaction ID generator 82 decreases transaction ID generation latency. Process 280 starts at step 282 and continues with step 284.

Step 284 initializes transaction ID generator 84. In one example of step 284, controller 120 is initialized to identify buffer A. Buffer A is initialized to transaction ID A, where transaction ID A is the first transaction ID. Buffer B is initialized to transaction ID B, where transaction ID B is the second transaction ID. In the example, signal 124 from controller 120 indicates buffer A; therefore selector 122 connects data path 128 to data path 132. Valid entry tracker 140 may also be initialized to indicate that all transaction IDs are not in use. As buffer A and buffer B are already loaded with ID A and ID B, respectively, priority encoder 138 outputs transaction ID C.

In step 286, process 280 waits for new transaction signal 136 to become active, indicating that transaction 100 has been received at transaction processor 84 and that transaction ID A has become active within system 10.

Step 288 updates transaction table 85 with information from transaction 100, received via data path 134. Data path 132 is used to select an entry in transaction table 85 corresponding to transaction ID A, which (in the example) is the transaction ID currently stored in buffer A, as identified by controller 120 and selected by selector 122.

In step 290, valid entry tracker 140 is updated. New transaction signal 136 causes valid entry tracker 140 to mark transaction ID A, received via data path 132, as currently active. Bit array 141 within valid entry tracker 140 is output to data path 144.

Step 294 is a decision. If buffer A is identified by controller 120, process 280 continues with step 296; otherwise process 280 continues with step 298.

Step 296 loads transaction ID C, as output by priority encoder 138 via data path 148, into buffer A. Process 280 continues with step 300.

Step 298 loads transaction ID C, as output by priority encoder 138 via data path 148, into buffer B. Process 280 continues with step 300.

In step 300, controller 120 is updated to indicate buffer B.

In step 302, selector 122 is updated to switch data path 130 to data path 132, as indicated by controller 120.

In step 304, priority encode 138 is updated to output transaction ID D on data path 148.

Process 280 continues with step 286, where process 280 waits for indication, via new transaction signal 136, that a new transaction ID is required.

In the example above, two unused transaction IDs are concurrently available for use by transaction processor 82. As appreciated by those skilled in the art, the number of transaction IDs available to transaction processor 82 may be increased to meet the transaction processing demand of transaction processor 82, and should not be limited by the above example. In one embodiment, transaction ID generator 84 may contain four buffers, A, B, C and D. Controllers 120 and 120' would then sequentially select each buffer, A, B, C and D in turn. By making a plurality of transaction IDs concurrently available to transaction processor 82, and using controller 120' and selector 122' within transaction processor 82 to select the transaction ID, delays associated with transaction ID generation and signal synchronization are avoided.

Figure 10:
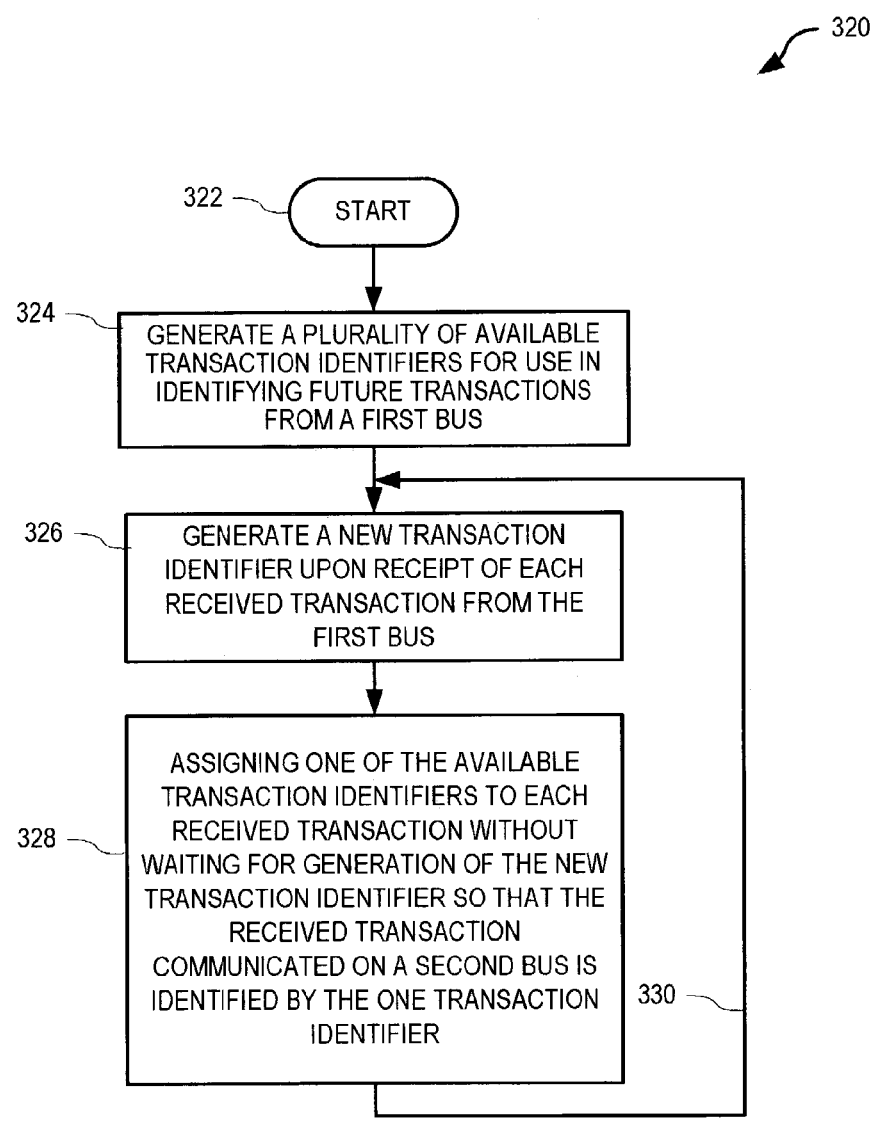
FIG. 10 is a flowchart illustrating one process for generating transaction identifiers.

FIG. 10 is a flowchart illustrating one process 320 for generating transaction identifiers. Process 320 starts at step 322 and continues with step 324. Step 324 generates a plurality of available transaction identifiers (e.g., ID A, ID B, FIG. 2) for use in identifying future transactions from a first bus (e.g., bus 14, FIG. 1). Step 326 generates a new transaction identifier (e.g., ID C, FIG. 2) upon receipt of each received transaction (e.g., transaction 36, FIG. 1) from the first bus. Step 328 assigns one of the available transaction identifiers to each received transaction without waiting for generation of the new transaction identifier so that the received transaction communicated on a second bus (e.g., bus 18, FIG. 1) is identified by the one transaction identifier. Process 320 may continue with step 326 and repeat 330 as needed.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for generating transaction identifiers, comprising:

generating a plurality of available transaction identifiers for use in identifying future transactions from a first bus;

generating a new transaction identifier upon receipt of each received transaction from the first bus; and assigning one of the available transaction identifiers to each received transaction prior to generation of the new transaction identifier so that the received transaction communicated on a second bus is identified by the one transaction identifier.

2. The method of claim 1, further comprising tabulating information of each received transaction and its assigned transaction identifier.

3. The method of claim 1, the step of assigning further comprising recording use of each assigned transaction identifier.

4. The method of claim 3, the step of recording comprising setting a bit array that specifies assigned transaction identifiers.

5. The method of claim 4, the steps of generating comprising determining unassigned transaction identifiers in the bit array.

6. The method of 5, further comprising storing the available transaction identifiers in two or more buffers, wherein the step of determining comprises the step of determining which of the available transaction identifiers are in the buffers.

7. The method of claim 6, further comprising the step of retiring the assigned transaction identifier when its received transaction expires.

8. The method of claim 1, further comprising the step of retiring the one transaction identifier when the received transaction expires.

9. The method of claim 8, the step of retiring comprising the step of clearing a bit in a bit array.

10. The method of claim 1, the steps of generating occurring in a first clock domain, the step of assigning occurring in a second clock domain, and further comprising the step of synchronizing signals from the first clock domain to the second clock domain, the signals specifying the available transaction identifiers.

11. The method of claim 1, the steps of generating occurring in a first clock domain, the step of assigning occurring in a second clock domain, and further comprising the step of synchronizing signals from the second clock domain to the first clock domain, the signals specifying a received transaction and its assigned transaction identifier.

12. A system for generating transaction identifiers, comprising:
    a transaction processor for receiving transactions and assigning an available transaction identifier to each of the received transactions; and
    a transaction ID generator for generating two or more available transaction identifiers and tracking assigned transaction identifiers, the transaction ID generator being responsive to a new transaction signal to generate a next available transaction identifier.

13. The system of claim 12, the transaction ID generator tabulating assigned transaction identifiers with each associated received transaction.

14. The system of claim 12, the transaction ID generator operating within a first clock domain, the transaction processor operating within a second clock domain, and further comprising a synchronizer for synchronizing signals between the first clock domain and the second clock domain, the signals from the first clock domain to the second clock domain specifying the available transaction identifiers, and the signals from the second clock domain to the first clock domain specifying a received transaction and its assigned transaction identifier.

15. The system of claim 12, the transaction ID generator comprising a bit array for storing the assigned transaction identifiers.

16. The system of claim 15, further comprising at least two buffers for storing the available transaction identifiers.

17. The system of claim 16, further comprising a priority encoder for determining a next available transaction identifier based upon values of the assigned transaction identifiers stored in the bit array and stored available transaction identifiers in the buffers.

18. The system of claim 15, further comprising means for clearing an assigned transaction identifier in the bit array when its associated transaction expires.

19. The system of claim 12, the transaction processor connected to a first bus and a second bus, the transaction processor and transaction ID generator cooperating such that received transactions from the first bus have assigned transaction identifiers when communicated on the second bus.

20. A chipset for communicating transactions from a first bus to a second bus, comprising:
    means for generating a plurality of available transaction identifiers for use in identifying presently unreceived transactions from the first bus;
    means for generating a new transaction identifier upon receipt of each received transaction from the first bus; and
    means for assigning one of the available transaction identifiers to each received transaction prior to generation of the new transaction identifier so that the received transaction communicated on the second bus is identified by the one transaction identifier.

* * * * *